United States Patent
Mulcay

(10) Patent No.: US 7,949,344 B1
(45) Date of Patent: May 24, 2011

(54) UNCOORDINATED MICROWAVE PATHS IN COORDINATED FREQUENCY BANDS

(75) Inventor: Michael Mulcay, Carmel Valley, CA (US)

(73) Assignee: Wireless Strategies, Inc., Hagerstown, MD (US)

( * ) Notice: Subject to any disclaimer, the term of this patent is extended or adjusted under 35 U.S.C. 154(b) by 723 days.

(21) Appl. No.: 11/674,621

(22) Filed: Feb. 13, 2007

Related U.S. Application Data

(60) Provisional application No. 60/772,751, filed on Feb. 13, 2006.

(51) Int. Cl.
*H04W 72/00* (2009.01)

(52) U.S. Cl. .................. 455/454; 455/426.1; 455/426.2; 455/447; 455/448

(58) Field of Classification Search .......... 455/445–449, 455/454, 63.1, 67.15, 456.4, 114.2, 63.3, 455/63.4, 67.13, 426.1, 426.2; 370/322, 370/354
See application file for complete search history.

(56) References Cited

U.S. PATENT DOCUMENTS

| | | | |
|---|---|---|---|
| 4,659,878 A | 4/1987 | Dinkins | |
| 4,736,453 A | 4/1988 | Schloemer | |
| 4,914,651 A | 4/1990 | Lusignan | |
| 4,965,850 A | 10/1990 | Schloemer | |
| 5,109,529 A | 4/1992 | Akaiwa | |
| 5,134,709 A | 7/1992 | Bi et al. | |
| 5,263,176 A | 11/1993 | Kojima et al. | |
| 5,463,671 A * | 10/1995 | Marsh et al. ................. | 379/56.1 |
| 5,497,503 A | 3/1996 | Rydberg et al. | |
| 5,655,217 A * | 8/1997 | Lemson ........................ | 455/513 |
| 6,415,150 B1 * | 7/2002 | Owens et al. ................. | 455/445 |
| 6,449,461 B1 * | 9/2002 | Otten ........................... | 455/63.1 |
| 6,892,068 B2 * | 5/2005 | Karabinis et al. ............. | 455/429 |
| 6,996,086 B2 * | 2/2006 | Wolfe et al. ................... | 370/338 |
| 2004/0162115 A1 * | 8/2004 | Smith et al. ................ | 455/562.1 |
| 2004/0259556 A1 * | 12/2004 | Czys ............................. | 455/447 |

OTHER PUBLICATIONS

"Proposed Rule Changes in the Part 101 Microwave Bands", Comsearch.com, WirelessPulse E-newsletter [online]. [retrieved on Sep. 16, 2010]. Retrieved from the Internet: <URL: http://www.comsearch.com/newsletter/WirelessPulse.html?emailwpid=>, 9 pages.

* cited by examiner

*Primary Examiner* — Kent Chang
*Assistant Examiner* — Magdi Elhag
(74) *Attorney, Agent, or Firm* — Fish & Richardson P.C.

(57) ABSTRACT

A system is described. The system includes a fixed microwave path pair between a first site and a second site and an additional microwave path between the first site and a third site. A transceiver portion of the first site and a transceiver portion of the second site are configured to transmit on the fixed microwave path pair on TDD-FDD reversed paired frequencies. The transceiver portion of the first site is configured to transmit to the transceiver portion of the third site on one frequency of the paired frequencies using the side lobe radiation of an antenna at the first site.

14 Claims, 6 Drawing Sheets

Linear Scale

UNCOORDINATED MICROWAVE PATHS IN COORDINATED FREQUENCY BANDS

RELATED APPLICATION

This application claims the benefit of the filing date of U.S. Provisional Application No. 60/772,751, which was filed on Feb. 13, 2006. The contents of U.S. Application No. 60/772,751 are incorporated by reference in their entirety.

TECHNICAL FIELD

This invention relates to operation of uncoordinated microwave paths in coordinated frequency bands.

BACKGROUND

The operation of microwave communications paths is regulated by governments, international bodies, and treaties. In the United States, use of microwave frequencies for communications is authorized for non-exclusive uncoordinated use and exclusive coordinated use. An example of uncoordinated use is Wireless Local Area Networks (WLANs) (e.g., operation in the Industrial Scientific and Medical (ISM) and Unlicensed National Information Infrastructure (UNII) bands operating under the Code of Federal Regulations (C.F.R.), Title 47, Part 15 (2002), often using IEEE 802.11 standards), where users are subject to interference from other users communicating on the same portion of the microwave spectrum. An example of exclusive coordinated use is fixed Point-To-Point (PTP) licensed systems (i.e., systems where the connection is strictly between two endpoints) operated for backhauling large data traffic between distributed sites and more centralized sites under 47 C.F.R. §101. For example, frequency bands between 3.7 GHz to 11.7 GHz (e.g., 3.7 GHz to 4.2 GHz, 5.9 GHz to 6.4 GHz, and 10.7 GHz to 11.7 GHz) can be used for fixed PTP licensed systems in the United States.

In the United States, an applicant for an exclusive fixed PTP license, for example from the Federal Communications Commission (FCC) or the National Telecommunications and Information Administration (NTIA), engineers the system, by appropriate studies, analyses, and selection of sites, transmitters, antennas, and frequencies to avoid interference in excess of permissible levels to other users in an Exclusive Use Area (EUA). Conventionally, fixed PTP systems on a coordinated microwave path operate in Frequency Division Duplex (FDD) mode, requiring two frequencies (i.e., one frequency for transmission in each direction between the two endpoint sites). For a fixed PTP path, the EUA boundary for the two frequencies is typically 125 miles from the antenna of a site, except for the antenna main lobe (about ±5 degrees), where the distance to the EUA boundary is typically 250 miles.

Generally, the prospective user of a proposed microwave path conducts both a site survey and a coordination study. The site survey includes verifying that there is a Line-Of-Site (LOS) path between the proposed endpoint sites and that the proposed sites can support the antennas. For example, the antenna support structure typically needs to withstand winds up to 125 mph. A coordination study is an analysis to identify any potential interference issues between the proposed sites and existing sites in the proposed EUA.

The proposed path applicant needs to conduct a prior coordination study, in accordance with government regulations, to ensure that the Equivalent Isotropic Radiated Power (EIRP) from the proposed path will not cause harmful interference (i.e., interference above a particular level) to other users operating on existing coordinated microwave paths on the proposed frequency pair and adjacent frequencies in the proposed path's EUA. A coordinated microwave path is a microwave path that has undergone a coordination study, as will be described in more detail below. An operator of a coordinated microwave path can receive a license to operate by a regulatory agency, e.g., the FCC. Once a proposed path is successfully prior coordinated and deployed, thereby becoming an existing path, it is the responsibility of the next proposed path applicant to ensure that a new proposed path does not cause harmful interference to the existing paths in the EUA.

If a proposed path applicant is unable, after conducting a prior coordination study, to prior coordinate a microwave path in an EUA for a particular frequency pair, the applicant may seek to prior coordinate the proposed path on a different frequency pair. However, this may not be possible, because the amount of spectrum in any given geographical area is finite. If it is possible, the path applicant performs a second, costly and time-consuming coordination study, issue a Prior Coordination Notice to all operators within the EUA, wait thirty days for any comments, and, if no adverse comments are received, wait for approval after regulatory filings. Additionally, if the proposed path applicant seeks to use an existing coordinated path site as one of the sites for the proposed path, an additional antenna and transceiver would be needed at the existing site to operate on the new frequency pair.

A conventional way to increase spectral efficiency is to configure a transmitter antenna to minimize the area in which harmful interference is produced. This may require minimizing the angle of the antenna radiation pattern main lobe and maximizing suppression of the antenna radiation pattern side lobes and back lobe. Typically, achieving narrow beam widths requires physically large, unsightly antennas, which can be expensive and can require substantial mounting structures to withstand high wind loading.

SUMMARY

In one aspect, a method is described. The method includes, in a safe area defined by the union of a first coordination area of a first site and a second coordination area of a second site, where a transceiver portion of the first site and a transceiver portion of the second site is configured to transmit on a coordinated microwave path pair on a first frequency and a second frequency and no other transceiver can operate on a different coordinated microwave path on the first frequency or the second frequency in the safe area without being subjected to or causing interference greater than a permissible level, transmitting on an uncoordinated microwave path from the transceiver portion of the first site to a transceiver portion of a third site located in the safe area on the first frequency.

Implementations of the invention may include one or more of the following features. Transmitting on the uncoordinated microwave path can use the side lobe radiation of an antenna at the first site. The transceiver portion of the first site and the transceiver portion of the second site can be configured to operate on a first coordinated microwave path in time domain duplex mode on the first frequency, and the transceiver portion of the first site and the transceiver portion of the second site can be further configured to operate on a second coordinated microwave path in time domain duplex mode on a second frequency.

In another aspect, a method is described. The method includes, in a safe area defined by the union of a first coordination area of a first site and a second coordination area of a second site, where a transceiver portion of the first site and a transceiver portion of the second site is configured to transmit on a coordinated microwave path pair on a first frequency and a second frequency and no other transceiver can operate on a different coordinated microwave path on the first frequency or the second frequency in the safe area without being subjected to or causing interference greater than a permissible level, transmitting on an uncoordinated microwave path from a transceiver portion of a third site located in the safe area to the transceiver portion of the first site on the first frequency.

Implementations of the invention may include one or more of the following features. The transceiver portion of the third site can be configured to transmit on another uncoordinated microwave path to the transceiver portion of the first site on the second frequency. The third site can be configured to operate as an access point or laptop for a personal area network, a wireless local area network, or a wireless metropolitan area network.

In one aspect, a method is described. The method includes, for a safe area defined by the union of a first coordination area of a first site and a second coordination area of a second site, where a transceiver portion of the first site and a transceiver portion of the second site is configured to transmit on a coordinated microwave path pair on a first frequency and a second frequency and no other transceiver can operate on a different coordinated microwave path on the first frequency or the second frequency in the safe area without being subjected to or causing interference greater than a permissible level, determining the configurations for one or more new sites, where each new site includes a transceiver portion to be configured to transmit on an uncoordinated microwave path to the transceiver portion of the first site on the first frequency.

Implementations of the invention may include one or more of the following features. Determining the configurations for one or more new sites can include, for each new site, selecting settings for one or more parameters of the new site, where the parameters include the location for an antenna, the orientation of the antenna, the gain of the antenna, or the power of the transceiver portion. Determining the configurations for one or more new sites can also include, for each new site, estimating the interference from the transceiver portion of the new site to a transceiver portion of one or more sites located outside the safe area, where the transceiver portion of each site located outside the safe area is configured to operate on a different coordinated microwave path on the first frequency. Determining the configurations for one or more new sites can include estimating the interference from the transceiver portion of the first site to the transceiver portion of the one or more sites located outside the safe area. Determining the configurations for one or more new sites can also include, for each new site and for each site located outside the safe area, determining whether the ratio of the interference from the transceiver portion of the first site to the interference from the transceiver portion of the new site is greater than or equal to one, and, for each new site and for each site located outside the safe area, if the ratio is not greater than or equal to one, adjusting the settings for the one or more parameters of the new site. One or more sites located outside the safe area can be an existing site or a modeled future site.

The interference from the transceiver portion of a site located inside the safe area to the transceiver portion of a site located outside the safe area, IFrxTrx, can be calculated according to: IFrxTrx=TrxEIRP+AFrx−96.6−20 log(Fo)−20 log(D), where: TrxEIRP=Equivalent Isotropic Radiated Power of the transceiver portion of the site located inside the safe area transmitting directly towards the transceiver portion of the site located outside the safe area in dBm, AFrx=antenna gain of the site located outside the safe area at an angle directly towards the transceiver portion of the site located inside the safe area in dBi, Fo=first frequency in GHz, and D=distance between the site located inside the safe area and the site located outside the safe area in miles.

In another aspect, a system is described. The system includes a first site including a transceiver portion, a second site including a transceiver portion configured to transmit to or receive from the transceiver portion of the first site on a coordinated microwave path pair on a first frequency or a second frequency, and a third site located in a safe area and including a transceiver portion configured to transmit to or receive from the transceiver portion of the first site on an uncoordinated microwave path on the first frequency, wherein the safe area is defined by the union of a first coordination area of the first site and a second coordination area of the second site and no other transceiver can operate on a different coordinated microwave path on the first frequency or the second frequency in the safe area without being subjected to or causing interference greater than a permissible level.

In one aspect, a first site is described. The first site includes a transceiver portion configured to transmit to or receive from a transceiver portion of a second site on an uncoordinated microwave path on a first frequency, where the first site is located in a safe area, the transceiver portion of the second site is configured to transmit to or receive from a transceiver portion of a third site on a coordinated microwave path pair on the first frequency or a second frequency, and the safe area is defined by the union of a first coordination area of the second site and a second coordination area of the third site and no other transceiver can operate on a different coordinated microwave path on the first frequency or the second frequency in the safe area without being subjected to or causing interference greater than a permissible level.

In another aspect, a first site is described. The first site includes a transceiver portion configured to transmit to or receive from a transceiver portion of a second site on a coordinated microwave path pair on a first frequency and a second frequency, where the transceiver portion of the first site is further configured to transmit to or receive from a transceiver portion of a third site on an uncoordinated microwave path on the first frequency, the third site is located in a safe area, and the safe area is defined by the union of a first coordination area of the first site and a second coordination area of the second site and no other transceiver can operate on a different coordinated microwave path on the first frequency or the second frequency in the safe area without being subjected to or causing interference greater than a permissible level.

In one aspect, a system is described. The system includes a fixed microwave path pair between a first site and a second site, where a transceiver portion of the first site and a transceiver portion of the second site are configured to transmit on the fixed microwave path pair on TDD-FDD reversed paired frequencies, and an additional microwave path between the first site and a third site, where the transceiver portion of the first site is configured to transmit to the transceiver portion of the third site on one frequency of the paired frequencies using the side lobe radiation of an antenna at the first site.

Particular embodiments of the subject matter described in this specification can be implemented to realize one or more of the following advantages. The antennas for the secondary sites can be inexpensive, unobtrusive, and physically small with reduced wind loading requirements. Removing the need to perform additional site surveys for secondary sites reduces costs and shortens service lead times. Deploying secondary sites does not require additional prior coordination studies and analysis, reducing costs and the number of regulatory filings necessary. Frequency reuse with statistical traffic loading increases spectral efficiency, as measured in bits per second per Hertz per subscriber. In addition to the PTP application of the spectrum, the spectrum can be used to provide Point-To-Multipoint (PTMP) services, e.g., backhaul, without using additional spectrum and without causing harmful interference to existing or future microwave paths. Secondary sites can be deployed around existing and new coordinated path sites. Coordinated path sites using Time Division Duplex-Frequency Division Duplex (TDD-FDD) reversed paired frequencies can transmit data at rates significantly above the data rates of coordinated path sites using conventional FDD.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Conventionally, for a fixed PTP system operating on a coordinated microwave path, two endpoint sites (e.g., base stations) communicate in FDD mode over a frequency pair. Each site includes a transceiver and an antenna. In FDD mode, the site transceiver is configured to transmit only on one frequency and receive only on the other frequency. For example, for Sites A and B operating on frequency pair F1 and F2, Site A transmits to Site B on F1 and Site B transmits to Site A on F2.

Figure 1:
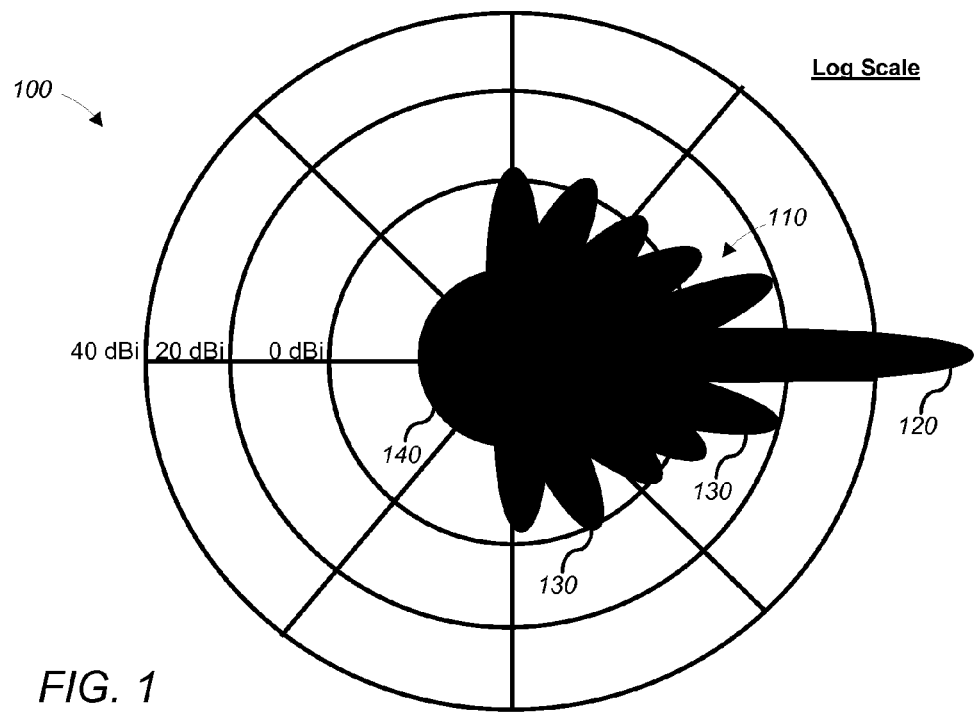
FIG. 1 is a logarithmic scale polar plot of the radiation pattern of a microwave directional antenna.

Typically, the antenna for a fixed site in a PTP system is a directional antenna (i.e., an antenna which radiates higher power in one direction). Referring to FIG. 1, the radiation pattern 110 of a microwave directional antenna can be illustrated with a polar plot 100 using logarithmic scale. The contours of the polar plot 100 correspond to the antenna gain in dBi, i.e., decibels over the gain of an ideal isotropic radiator. A plot of the radiation pattern shows the antenna gain as a function of angle or direction. The radiation pattern 110 consists of a main lobe 120, one or more side lobes 130, and a back lobe 140.

The main lobe 120 illustrates the beamwidth of maximum antenna gain. Typically, for directional antennas in a PTP system, the beamwidth is within ±3 degrees. The angle of the back lobe 140 is typically from about 100 to 260 degrees. In a PTP system, the main lobe of a site antenna is pointed towards the other site in the link. The side lobes 130 and the back lobe 140 have a suppressed gain relative to the main lobe. For example, in the radiation pattern of FIG. 1, the main lobe 120 has a gain that is greater than 40 dBi, the side lobes 130 have gain levels that are less than 20 dBi, and the back lobe 140 has a gain of approximately −10 dBi. A directional antenna with a narrow beamwidth and suppressed side and back lobes is preferred in order to minimize the creation of interference to other receivers and to minimize the interference received from other sites. This may require an antenna which is expensive, unsightly, and large, requiring substantial mounting structures to withstand high wind loading.

Figure 2:
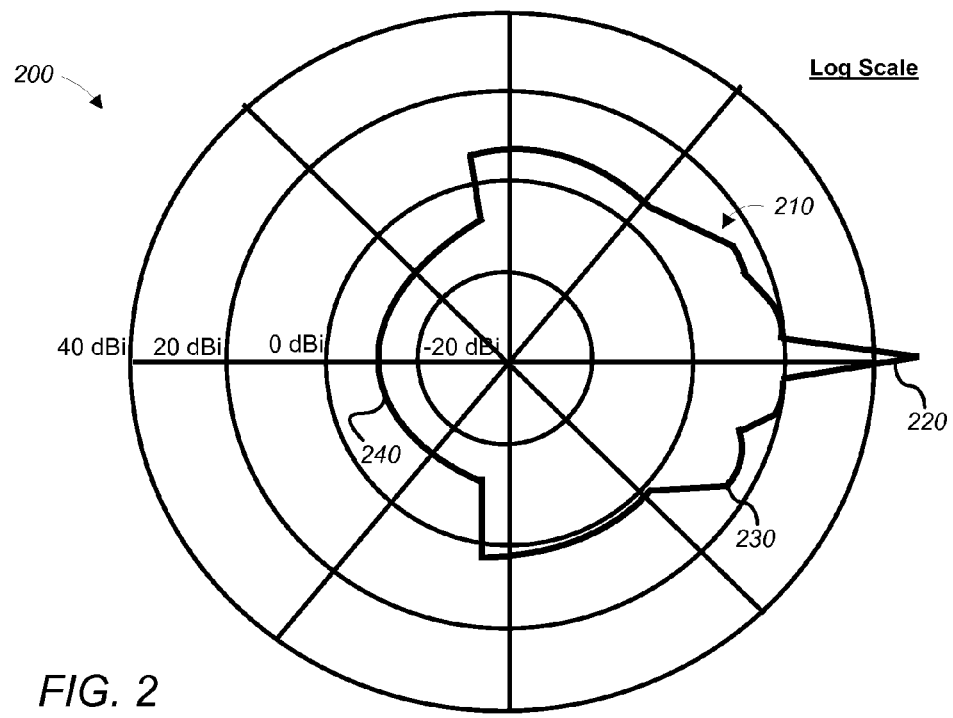
FIG. 2 is a logarithmic scale polar plot of the radiation pattern envelop (RPE) for a microwave directional antenna.

In the United States, the FCC requires operators of fixed PTP sites on coordinated microwave paths to only use antennas which meet or exceed a specified Radiation Pattern Envelope (RPE). Referring to FIG. 2, an RPE 210 for a microwave directional antenna can be illustrated with a polar plot 200 using logarithmic scale. The length of a vector from the center of the plot to the RPE contour corresponds to the antenna gain in dBi in the direction of the vector. The FCC regulations specify the maximum gain of the back lobe and side lobes, relative to the main lobe, that a microwave directional antenna can have. The RPE 200 has a contour line showing the maximum gain allowed for the main lobe 220, the side lobe region 230, and the back lobe 240. A proposed path applicant wishing to prior coordinate a microwave path must demonstrate that the antenna of the proposed site will have a radiation pattern that meets or exceeds the regulation-specified RPE. That is, the radiation pattern (e.g., the radiation pattern 110 of FIG. 1) of the proposed antenna must be within the contours of the RPE 210.

Generally, the applicant of a proposed microwave path needs to conduct a prior coordination study to demonstrate that the power that would be generated by operation on the proposed path would not cause harmful interference to other users operating on existing coordinated microwave paths on the proposed frequency pair or adjacent frequencies in the proposed path's EUA. The applicant calculates the interference levels through simulations and analysis. Knowing the configurations of existing coordinated sites in the proposed path's EUA, the applicant can test various configurations for the proposed sites and calculate the resulting interference levels. The configuration for a site includes the antenna location, the antenna orientation, and the EIRP, where the EIRP is the sum of the antenna gain and the transmitter power in dB.

The interference, IFrxTrx, from the transceiver of a proposed site received at a transceiver of an existing site can be calculated using the following equation:

$$\text{IFrxTrx} = \text{TrxEIRP} + \text{AFrx} - 96.6 \text{ dB} - 20 \log(Fo) - 20 \log(D) \quad \text{(Eqn. 1)}$$

In Eqn. 1, TrxEIRP is the EIRP of the transceiver of the proposed site transmitting directly towards the transceiver of the existing site in dBm (power in decibels relative to one milliwatt). AFrx is the antenna gain, in dBi, of the existing site at an angle directly towards the transceiver of the proposed site. Fo is the operating frequency in gigahertz (GHz), and D is the distance, in miles, between the proposed site and the existing site. IFrxTrx is measured in dBm. The frequency term, the distance term, and the constant (96.6 dB) in Eqn. 1 represents the free space loss (i.e., path loss) of the transmission. The TrxEIRP can be calculated using the proposed site transceiver power, the antenna gain, and the antenna radiation suppression (i.e., for back lobe and side lobes) as a function of angle.

As an example, a proposed site can have a transmitter power of 30 dBm, antenna gain of 39 dBi (at zero degrees), and antenna radiation suppression of 55 dB for angles of 100 to 260 degrees. At zero degrees, the TrxEIRP equals 30 dBm+39 dBi=69 dBm. At 180 degrees, the TrxEIRP equals 30 dBm+(39 dBi−55 dB)=14 dBm when the proposed site is transmitting out of its back lobe (i.e., angles from about 100 to 260 degrees) to an existing site located behind the proposed site.

The proposed path applicant performs the studies at all angles around the proposed site and calculates the interference using Eqn. 1. If the interference is greater than the regulation-defined interference threshold, the applicant must adjust the proposed site configuration. This process continues until the proposed path applicant determines a configuration for the proposed site that will not subject any existing site in the proposed path's EUA (operating on the proposed frequencies or adjacent frequencies) to interference above the interference threshold. The applicant then advises all existing operators within the EUA of the findings and gives them a period of time, typically thirty days, to raise any objections. If no objections are received, the applicant completes the licensing process.

Upon deployment of paired sites for a PTP system on a prior coordinated microwave path, each site has a coordination contour defining its region of interference. In the United States, regulation 47 C.F.R. §101.3 (2002) defines the coordination area for a station (i.e., site) to be the "area associated with a station outside of which another station sharing the same or adjacent frequency band neither causes nor is subject to interfering emissions greater than a permissible level." The coordination contour is defined as the "line enclosing the coordination area." The contents of 47 C.F.R. §101.3 are incorporated by reference. The permissible level for interfering emissions is defined in 47 C.F.R. §101.105 which is also incorporated by reference. The FCC regulations referred to in this application are to be understood as the regulations in place on the filing date of the application.

Figure 3:
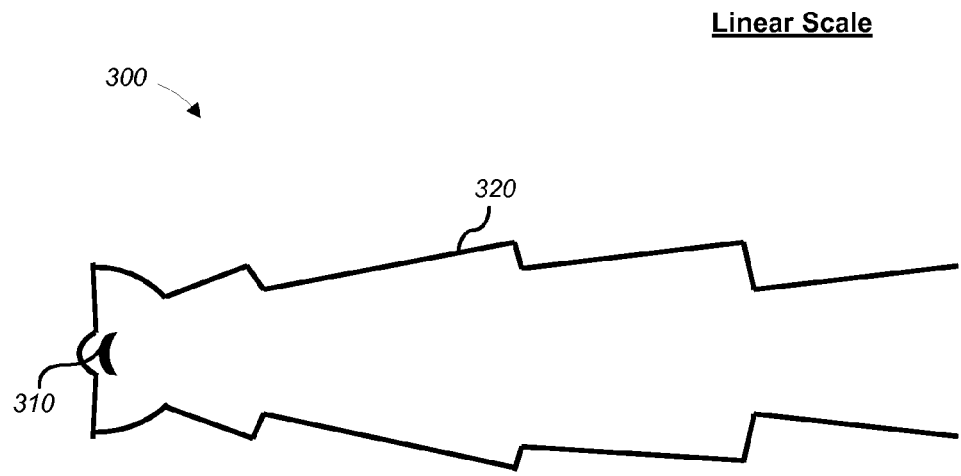
FIG. 3 is a linear scale plot of the coordination contour of a PTP site operating on a coordinated microwave path.

Referring to FIG. 3, the coordination contour 320 of a PTP site 310 operating on a coordinated microwave path can be illustrated with a linear plot 300. The linear plot 300 shows the radiation pattern of the antenna at site 310 in linear distance. For a conventional PTP system operating in FDD, the transceiver of site 310 only transmits on one frequency, e.g., frequency F1. Existing and future coordinated sites located outside the coordination contour 320 of site 310 can safely operate on frequency F1 or adjacent frequencies without being subject to harmful interference from site 310.

Figure 4:
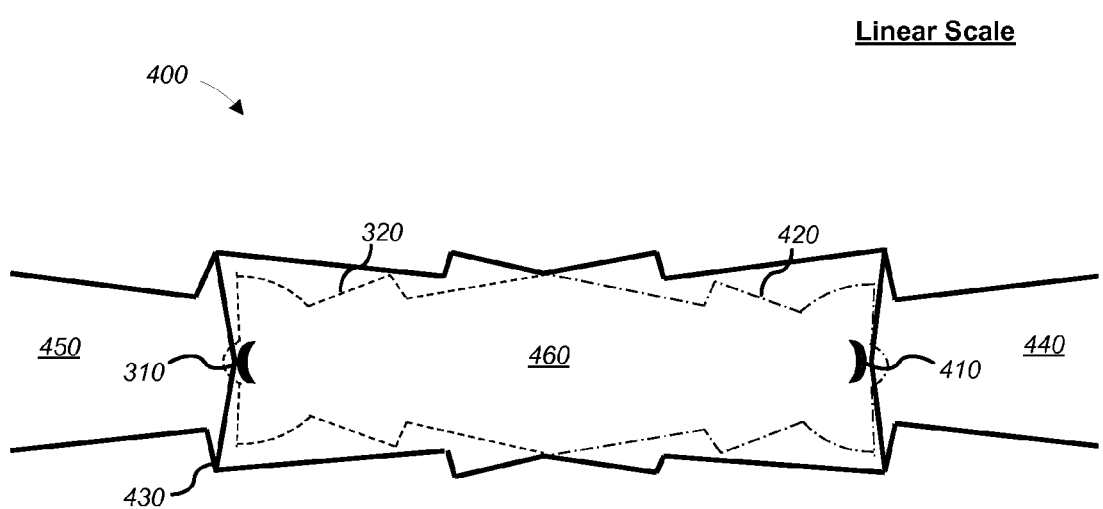
FIG. 4 is a linear scale plot of the combined coordination contour of a pair of PTP sites operating FDD on a coordinated microwave path.

Referring to FIG. 4, the combined coordination contour 430 of a pair of PTP sites 310, 410 operating FDD on a coordinated microwave path can be illustrated with a linear plot 400. The plot 400 shows the coordination contour 320 of site 310 transmitting on frequency F1 and the coordination contour 420 of site 410 transmitting on frequency F2. The combined coordination contour 430 is the union of the coordination areas for site 310 and site 410. The area 440 is the area in which no existing or future coordinated site can prior coordinate on frequency F1. The area 450 is the area in which no existing or future coordinated site can prior coordinate on frequency F2. In the area 460, no existing or future site can operate on a different coordinated microwave path (than the coordinated path between sites 310, 410) on frequency F1 or frequency F2. In this conventional PTP system, the side lobe radiation of the antennas is a major limitation on the frequency reuse in a geographical area.

Operating a pair of fixed sites as a PTP system using TDD-FDD reversed paired frequencies on two coordinated microwave paths (i.e., a coordinated microwave path pair) can define a safe area in which secondary sites can operate on the same frequencies on uncoordinated microwave paths. The sites are named secondary sites, because they are additional sites added to the safe area defined by the primary sites operating on the coordinated microwave path pair. The safe area is an area where the secondary sites can operate without being subject to harmful interference from a coordinated site located outside the safe area. The primary sites of the PTP system can also provide PTMP service, where the primary sites communicate with and share capacity with secondary sites located in the safe area. The primary sites communicate with the secondary sites using the main or side lobe radiation of the primary site's antennas.

The frequencies used by the secondary sites must be from the set of frequencies used by the primary sites. The secondary sites can operate on fewer frequencies than the primary sites. In some implementations, the primary sites of the PTMP system operate with more than two frequencies, with a separate coordinated microwave path for each frequency. If the primary sites communicate on N frequencies, the secondary sites can communicate on less than N frequencies. For example, if the primary sites operate on two TDD-FDD reversed frequencies, a secondary site can operate on only one of those frequencies. Alternatively, the secondary site can operate on additional frequencies (from the set of frequencies used by the primary sites) if additional transceivers are included at the secondary site.

In a PTP system, operating in TDD-FDD reversed paired frequencies allows each fixed primary site to transmit to and receive from the other fixed primary site on both frequencies. That is, information is transmitted in TDD mode between the primary sites on each of the paired frequencies. TDD mode allows communication on a particular frequency to occur in either direction between the primary sites, but only one primary site can transmit on that particular frequency at a time.

Figure 5:
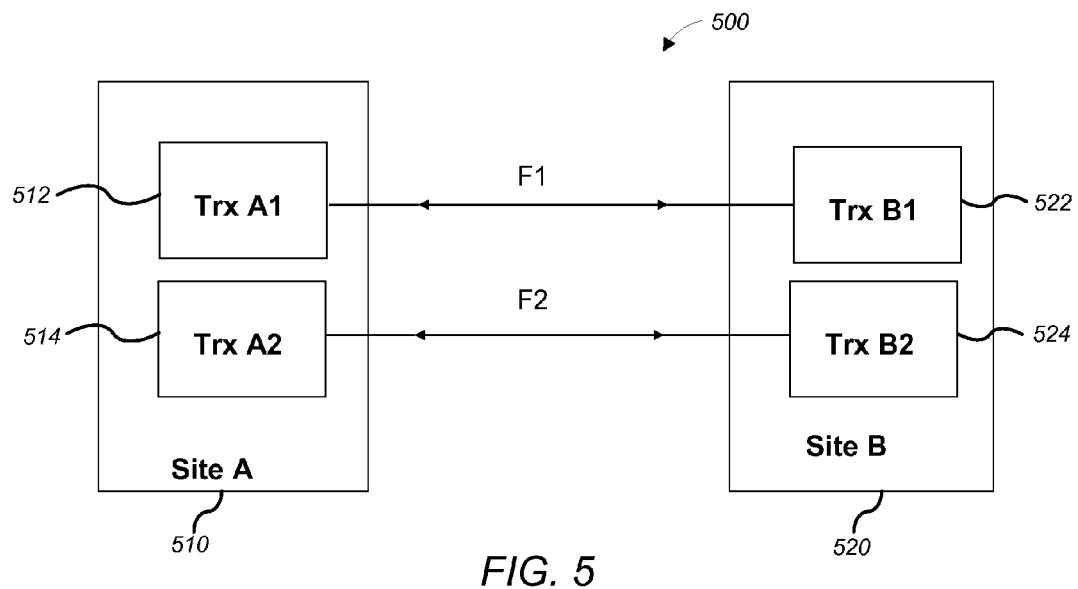
FIG. 5 is a block diagram illustrating a PTP system with two fixed sites operating on a coordinated microwave path with TDD-FDD reversed paired frequencies.

Referring to FIG. 5, a PTP system 500 with two primary sites, Site A 510 and Site B 520, operating on a coordinated microwave path pair with TDD-FDD reversed paired frequencies is shown. Site A 510 includes a transceiver portion with two transceivers, TrxA1 512 and TrxA2 514. Site B 520 includes a transceiver portion with two transceivers, Trx B1 522 and TrxB2 524. The transmitter portion of TrxA1 512 can transmit a signal to the receiver portion of TrxB1 522 on frequency F1 on a first coordinated microwave path. Similarly, the transmitter portion of TrxB1 522 can also transmit a signal to the receiver portion of TrxA1 512 on frequency F1 on the first coordinated microwave path. However, only one of the two transceivers can transmit on frequency F1 at any given time. The same is true for transmissions between TrxA2 514 and TrxB2 524 on frequency F2 on a second coordinated microwave path. This PTP TDD-FDD reversed paired frequencies system allows a primary site to transmit at up to twice the data rate of a conventional PTP FDD system. This is because a primary site of the PTP TDD-FDD system can transmit on both frequencies simultaneously, whereas a site of a conventional PTP FDD system can only transmit on one of the two frequencies at a time.

Figure 6:
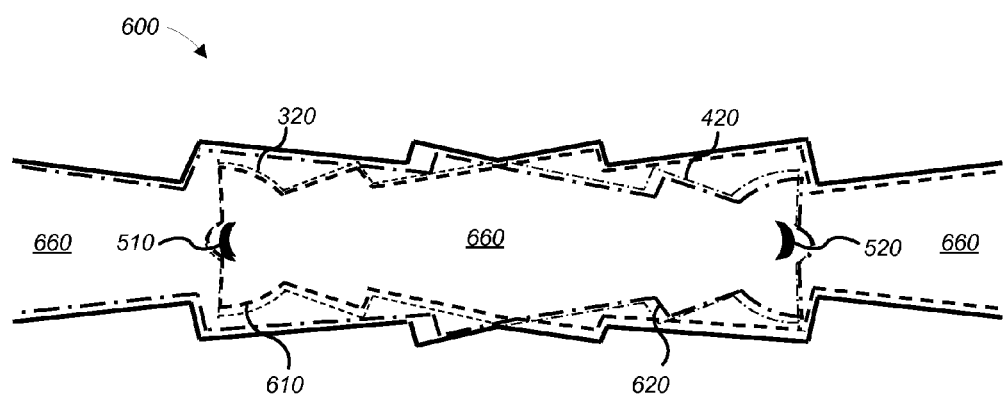
FIG. 6 is a linear scale plot of the safe area of a pair of primary sites operating TDD-FDD reversed paired frequencies on a coordinated microwave path.

A PTP system using TDD-FDD reversed paired frequencies can define a safe area which is union of the four coordination areas for the two primary sites on both frequencies. FIG. 6 is representative of a linear scale plot 600 of the safe area 660 of a pair of primary sites operating TDD-FDD reversed paired frequencies on a coordinated microwave path pair. FIG. 6 shows the coordination contour 320 of site 510 transmitting on frequency F1 and the coordination contour 420 of site 520 transmitting on frequency F2. Additionally, FIG. 6 also shows the coordination contour 610 of site 510 transmitting on frequency F2 and the coordination contour 620 of site 520 transmitting on frequency F1. The safe area 660 is the union of the four coordination contours 320, 420, 610, and 620. Because both primary sites of a PTP TDD-FDD reversed paired frequencies system can transmit on both frequencies, virtually the entire safe area 660 of the two primary sites is an area in which no existing or future site can prior coordinate a different microwave path without being subject to or causing harmful interference on frequencies F1 or F2 from or to at least one of the primary sites.

The distance from a primary site transceiver to its coordination contour (DccTrx) can be calculated by modeling a system where the antenna of a hypothetical site is located directly on the primary site's coordination contour. DccTrx, as measured in miles, can be calculated by using the following equation:

$$\text{DccTrx} = \text{anti log}(\text{TrxEIRP} + \text{AcFrx} - \text{ITFrx} - 96.6 \text{ dB} - 20 \log(Fo)/20) \quad \text{(Eqn. 2)}$$

In Eqn. 2, TrxEIRP is the EIRP of the transceiver portion of the primary site transmitting directly towards the transceiver portion of the hypothetical site in dBm. AcFrx is the antenna gain, in dBi, of the hypothetical site when the hypothetical site's antenna is located on the contour and pointed at an angle directly away from the transceiver portion of the primary site. ITFrx is the interference threshold of the hypothetical site transceiver in dBm, and Fo is the operating frequency in GHz.

AcFrx can be set to the maximum back lobe antenna gain for a commercially-available directional microwave antenna. In one implementation, the interference threshold ITFrx means the threshold specified by the FCC regulations. For example, the ITFrx is generally defined in the FCC regulations, 47 C.F.R. §101.105, as the signal level that lowers the hypothetical site receiver threshold by 1 dB.

For example, for a receiver sensitivity of −70 dBm (e.g., for a desired $10^{-6}$ bit error rate), a signal to noise ratio of 25 dB (e.g., for a desired spectral efficiency of 4.47 bps/Hz), and an interference to noise ratio of 10 dB (e.g., to decrease the signal to noise ratio by 1 dB), the ITFrx is equal to −70 dBm−25 dB−10 dB=−105 dBm.

For each primary site and each of the paired frequencies, the coordination contour can be calculated by modeling hypothetical sites located at all angles around the primary site. For each angle, there is a different antenna radiation value (main lobe, side lobes, and back lobes). The TrxEIRP can be calculated, as described above. TrxEIRP can then be used to calculate the distance to the coordination contour using Eqn. 2. The safe area is the union of the four coordination areas for the two primary sites on both frequencies. The safe area boundary is the perimeter of the safe area in the special case where the near-end antenna of a hypothetical path has its back lobe pointed directly at both primary sites and the far-end antenna of the hypothetical path is neither receiving unacceptable interference from the primary sites nor transmitting unacceptable interference to the primary sites.

An existing PTP FDD system operating on a coordinated microwave path pair can be reconfigured to operate using TDD-FDD reversed paired frequencies. Each primary site of the converted system requires two transceivers to allow the primary site to transmit and receive on both frequencies. The addition of a transceiver and an antenna to each existing primary site results in the need for an additional coordination study to prior coordinate the new microwave path between the new transceiver pairs.

Primary sites of a fixed PTP system operating with TDD-FDD reversed paired frequencies on coordinated microwave path pairs can also provide PTMP service for secondary sites located in the safe area on uncoordinated microwave paths. These secondary sites can transmit to and receive from at least one of the primary sites on uncoordinated microwave paths on one of the frequencies in the frequency pair. In some implementations, the secondary sites have two transceivers, allowing them to transmit to and receive from the primary sites on both of the frequencies.

Figure 7A:
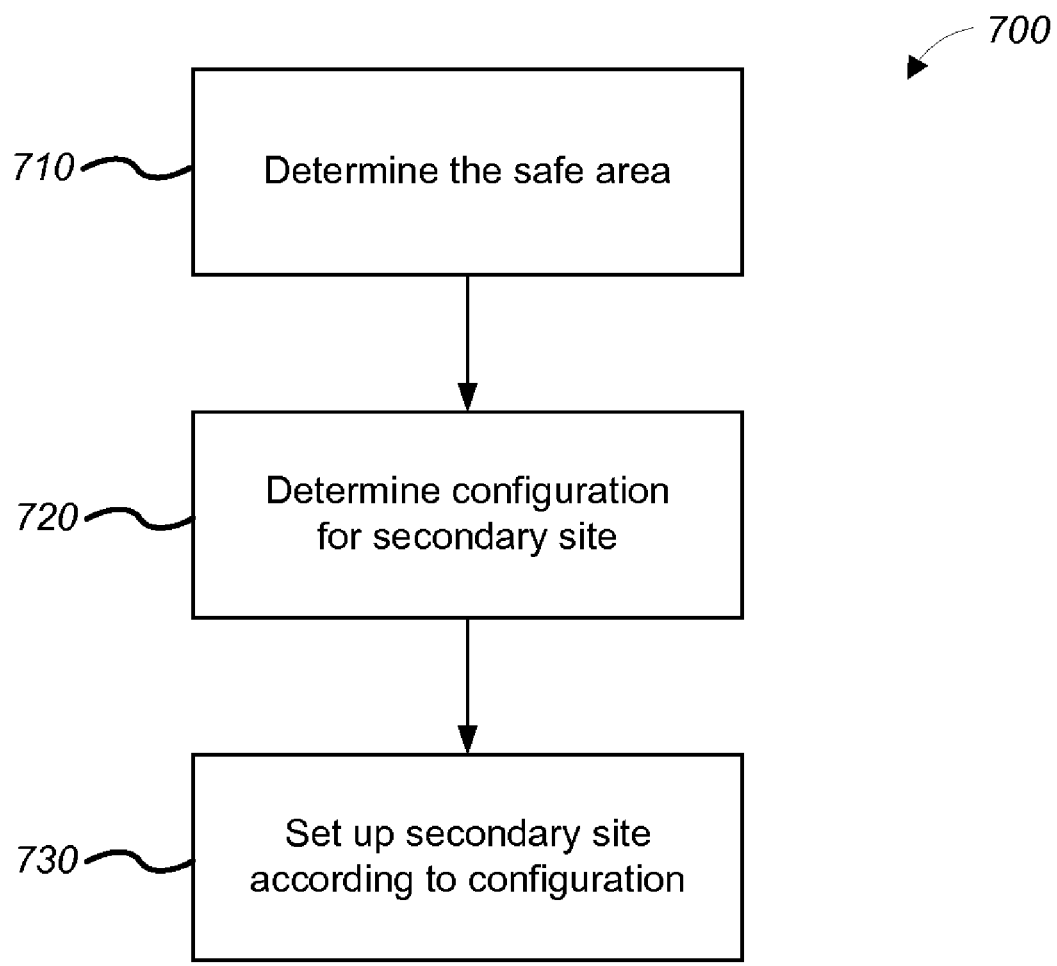
FIG. 7A illustrates an example process for installing a secondary site for operation on an uncoordinated microwave path in the safe area of a coordinated microwave path pair.

FIG. 7A illustrates an example process 700 for installing a secondary site for operation on an uncoordinated microwave path in the safe area of a coordinated microwave path pair. Installation of a secondary site includes determining the safe area associated with the coordinated microwave path pair (step 710), determining the configuration for the secondary site (step 720), and setting up the secondary site according to the configuration determined (step 730).

The safe area is determined as a consequence of performing a coordination study for a new exclusive use microwave link, either for a new PTP system or a converted existing PTP system.

The configuration of one or more secondary sites in the safe area is determined such that deployment of the one or more secondary sites will not create harmful interference to existing or future primary sites located outside the safe area operating on different coordinated microwave paths than the coordinated path pair between the primary sites located inside the safe area. Configuration of one or more secondary sites includes determining locations in the safe area to locate the one or more secondary sites.

Figure 7B:
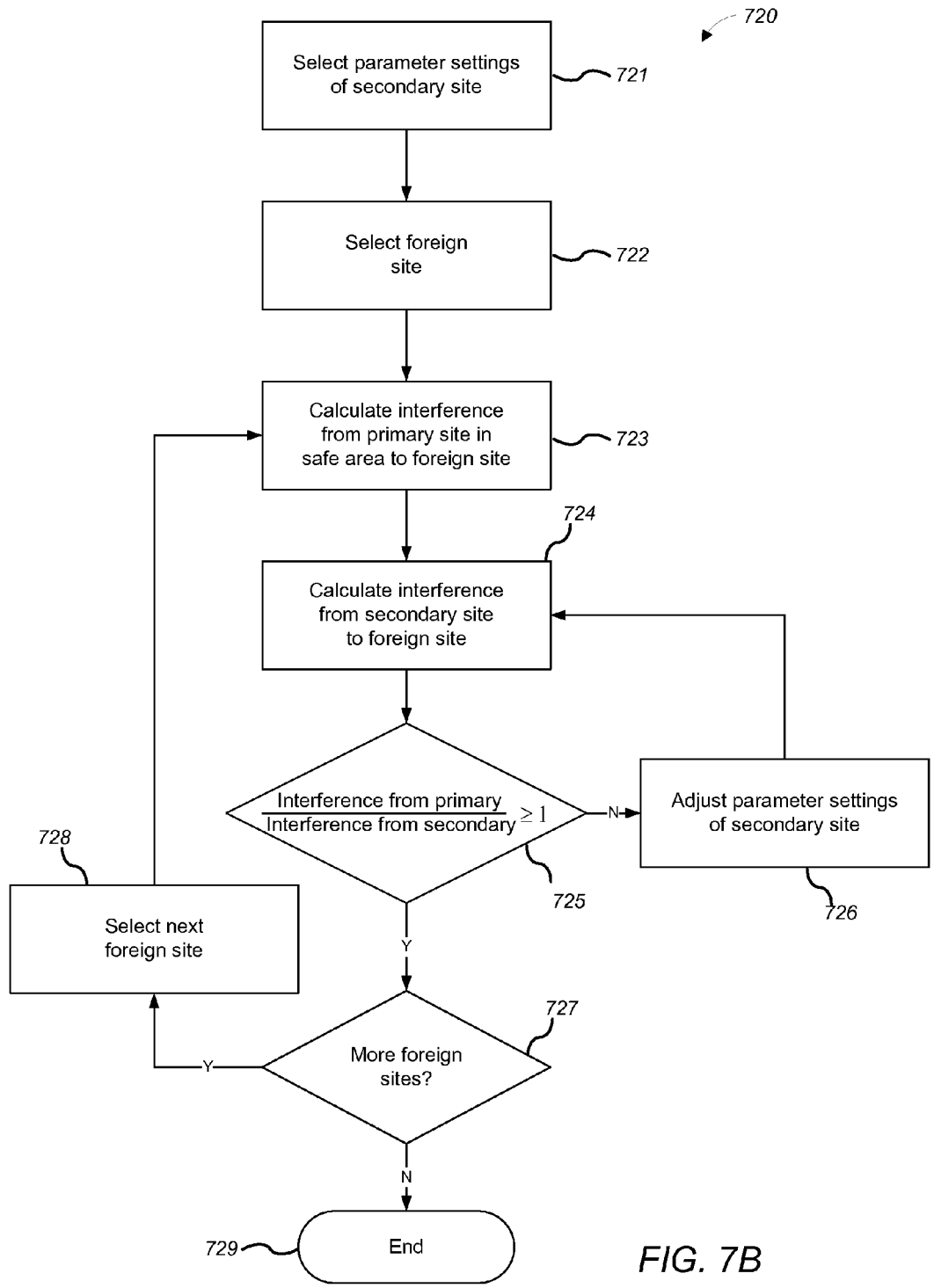
FIG. 7B illustrates an example process for determining the configuration for a secondary site for operation on an uncoordinated microwave path in the safe area of a coordinated microwave path pair.

FIG. 7B illustrates an example process 720 for determining the configuration for a secondary site for operation on an uncoordinated microwave path in the safe area of a coordinated microwave path pair.

Determining the configuration for a secondary site includes selecting settings for one or more parameters of the secondary site (step 721), including the antenna location, the antenna orientation, the transceiver power, and the antenna gain. The configuration of secondary sites can be determined through experimentation in the field, prior simulation or analysis, or some combination of these.

The configuration of secondary sites can be determined by placing the secondary site at a location and iteratively calculating interference levels (using Eqn. 1) and adjusting the settings for one or more parameters of the secondary site. An existing foreign site (i.e., a primary site located outside the safe area) is selected (step 722), where the foreign site operates on a different coordinated microwave path. Calculating the interference levels includes calculating the interference from each fixed primary site in the safe area to the foreign site (step 723). The interference from the secondary site to the foreign site is also calculated (step 724). For the foreign site, the ratio of the interference from the primary site to the interference from the secondary site is calculated, and this ratio is tested to see if it is greater than or equal to one (step 725). The secondary site must satisfy an interference requirement that the interference ratio is greater than or equal to one (i.e., 0 dB). This interference requirement will be described in more detail below.

As an example, for a primary site with a transmitter power of 30 dBm and maximum antenna gain of 39 dBi, at zero degrees, the TrxEIRP equals 30 dBm+39 dBi=69 dBm. An applicant can add a secondary site in the safe area on the center line between the primary sites with a transmitter power of −24 dBm, maximum antenna gain of 30 dBi, and antenna radiation suppression of 40 dB for angles of 100 to 260 degrees. The back lobe TrxEIRP equals −24 dBm+(30 dBi−40 dB)=−34 dBm when the secondary site is transmitting out of its back lobe to a foreign site (i.e., an existing primary site located outside the safe area) in line with the primary site's main antenna lobe. In this example, the primary interference to secondary interference ratio is simply the ratio of the EIRPs (i.e., 69 dBm−(−34 dBm)=103 dB).

If the interference requirement is not satisfied, one or more of the parameter settings of the secondary site is adjusted (step 726), and the process repeats from step 724. When the secondary site satisfies the interference requirement for the selected existing foreign site, if there are more existing foreign sites (step 727), another foreign site located outside the safe area can be selected (step 728), and the process repeats from step 723. Once the configuration of the secondary site satisfies the interference requirement for all existing foreign sites, the configuration process is complete (step 729) and the secondary site can be fixed in the field and safely operated without creating harmful interference to these existing foreign sites outside the safe area. However, if future foreign sites are proposed outside the safe area, the secondary site may require reconfiguration to ensure the interference requirement is satisfied with respect to the proposed foreign sites.

Prior coordination of the primary sites defines the safe area in which no other transceiver can operate a different coordinated path on the same frequency or adjacent frequencies without causing or being subjected to interference greater than a permissible level. A future primary site that will be coordinated on a different microwave path outside the safe area must not cause or receive harmful interference to or from the primary site in the safe area. However, a secondary site operating in the safe area could potentially create harmful interference to the future primary site if interference from the secondary site to the location of the future primary site was never modeled (and satisfaction of the interference requirement for that scenario was never verified). The need to reconfigure a secondary site can be minimized by running simulations to model future proposed primary sites.

Simulations can be performed to test possible configurations of secondary sites with existing and hypothetical future primary sites located outside the safe area. For example, for a given proposed configuration of an individual secondary site in the safe area, a simulation can estimate the interference to multiple modeled future primary sites outside the safe area with hypothetical configurations. With this proposed secondary site configuration, the interference from the secondary site to the multiple modeled future primary sites outside the safe area can be estimated. The interference from each primary site in the safe area to the multiple modeled future primary sites outside the safe area is also estimated. If the proposed secondary site configuration does not satisfy the interference requirement (i.e., [interference from primary]/[interference from secondary]≧1) for all the modeled future primary sites, the secondary site configuration can be adjusted and the interference ratios can be recalculated. By running a series of simulations that comprehensively tests the possible configurations (antenna location, antenna orientation, etc.) of the modeled future sites on different coordinated microwave paths outside the safe area, it is possible to determine with a high likelihood whether a given proposed configuration of a secondary site will satisfy the interference requirement for future proposed primary sites outside the safe area.

This process can be performed individually for each proposed secondary site or in advance to determine all possible configurations for future secondary sites. However, because the simulations cannot model all possible scenarios and effects, a secondary site deployed through this method may still require some reconfiguration in the field.

In some implementations, the locations of secondary sites may be thermal noise limited such that the secondary sites are located a significant distance from the safe area. As an example, a secondary site can be configured with a transmitter with relatively low power and an antenna with a relatively low gain. In order to communicate with a primary site, the secondary site would need to be located a short distance from the primary site. In this case, the location of the secondary site is more a factor of the transmission loss (from the secondary site to the primary site located in the safe area) than the interference from the secondary site to a primary site located outside the safe area.

In a PTMP system, the TDD-FDD reversed paired frequencies system allows each primary site to transmit to and receive from another site (i.e., the other primary site or a secondary site) in the safe area on at least one of the paired frequencies. Transmission on each frequency in TDD mode ensures that only one site in the safe area is transmitting on a particular frequency at a time. Hence, the primary sites located outside the safe area operating on one of the paired frequencies are only subject to interference from one site (either a primary site or a secondary site) operating at the same frequency at any particular time.

Because (1) a PTMP TDD-FDD reversed paired frequencies system operates in TDD mode on each of the paired frequencies in the safe area and (2) all of the secondary sites in the safe area must satisfy the interference requirement (i.e., [interference from primary]/[interference from secondary] ≧1) for primary sites located outside the safe area, an existing or future primary site located outside the safe area will not be subject to interference from a site in the safe area that is greater than the interference from a primary site in the safe area. Therefore, because the safe area is defined such that the amount of interference created by a primary site in the safe area is not harmful to an existing or future primary site outside the safe area, an existing or future primary site located outside the safe area will not be subject to harmful interference from any sites in the safe area. This will hold true as long as the interference requirement is verified (e.g., through simulation) for all existing and future primary sites located outside the safe area.

Figure 8:
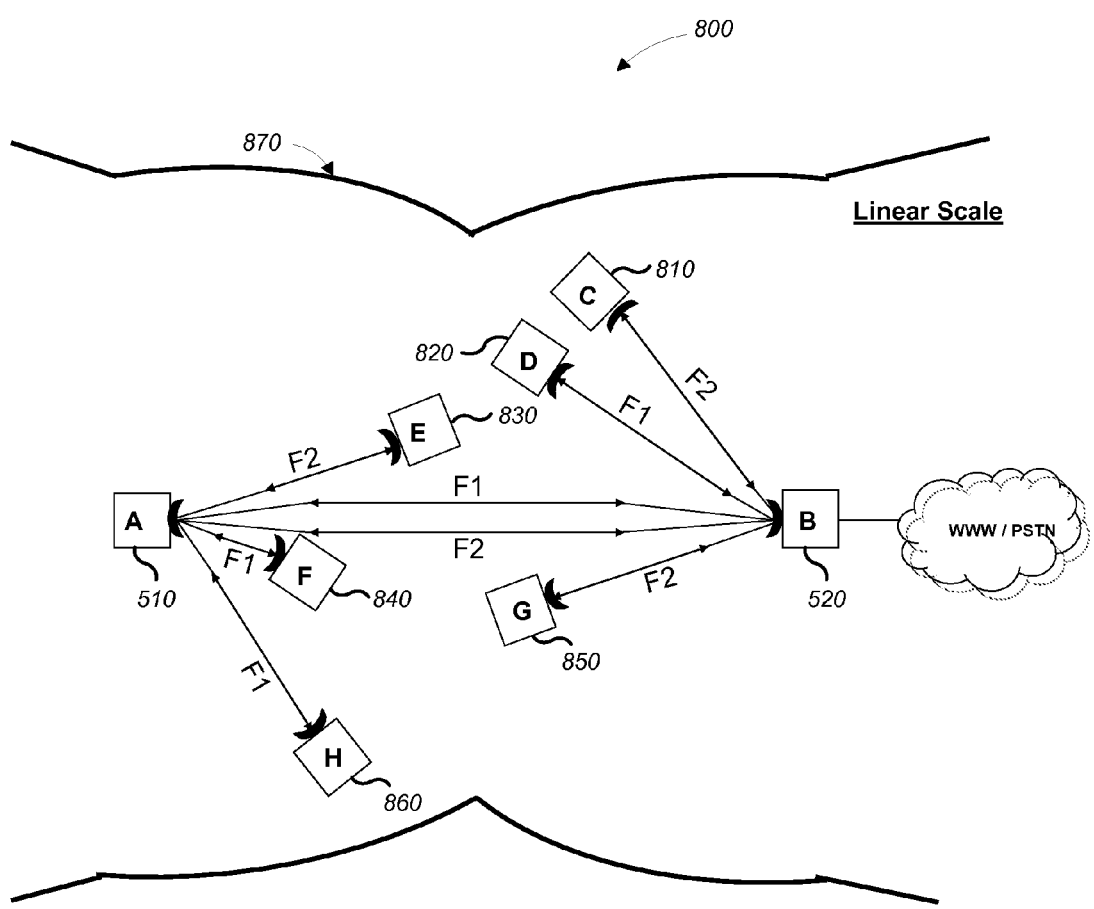
FIG. 8 is a block diagram illustrating a system operating uncoordinated microwave paths in the safe area of a coordinated microwave path.

Referring to FIG. 8, a system 800 operating uncoordinated microwave paths in the safe area 870 of a coordinated microwave path pair is shown. FIG. 8 shows a pair of primary sites, Site A 510 and Site B 520. The primary sites 510, 520 operate with TDD-FDD reversed paired frequencies, as shown in FIG. 5. Site A 510 and Site B 520 can operate PTP on the coordinated microwave path pair on frequencies F1 and F2. The frequencies F1 and F2 can be frequencies allocated, e.g., by the FCC or NTIA in the United States, for fixed PTP systems, such as frequencies in frequency bands between 3.7 GHz to 11.7 GHz (e.g., 3.7 GHz to 4.2 GHz, 5.9 GHz to 6.4 GHz, and 10.7 GHz to 11.7 GHz).

Additionally, Site A 510 and Site B 520 can provide PTMP service to secondary sites in the safe area 870 on uncoordinated microwave paths using frequencies F1 and F2. In particular, Site C 810 and Site G 850 can communicate with (i.e., transmit to and receive from) Site B 520 on uncoordinated microwave paths on frequency F2. Site D 820 can communicate with Site B 520 on an uncoordinated microwave path on frequency F1. Because Site B 520 operates in TDD mode on frequency F2, Site B can only transmit to or receive from one of sites A, C, and G on frequency F2 at any particular time. Site A 510 can communicate with Site E 830 on an uncoordinated microwave path on frequency F2. Site A 510 can also communicate with Site F 840 and Site H 860 on uncoordinated microwave paths on frequency F1. FIG. 8 also shows that Site B 520 can connect to the Internet or the Public Switched Telephone Network (PSTN). Sites A, C, D, and G can also connect to the Internet or PSTN through Site B. In some implementations, a secondary site can communicate with a primary site on both of the paired frequencies if the secondary site includes two transceivers.

Operation of the PTMP system with TDD-FDD reversed paired frequencies allows the side lobe radiation of the primary site antenna to be used for transmission and reception on an uncoordinated microwave path. Conventionally, the side lobe radiation of the primary site antenna prohibited operation of another coordinated microwave path in the region of the side lobe. The ability to add uncoordinated microwave paths in these side lobe regions provides reuse of licensed frequencies without the need to conduct a coordination study to add a new coordinated microwave path.

Communication in TDD mode on each of the paired frequencies results in the capacity of the primary sites being shared among the secondary sites. The upload and download speeds on the paired frequencies can be adjusted to optimize traffic loading. Additionally, because the primary sites can transmit on both frequencies simultaneously, a primary site can burst data at nearly twice the speed of a conventional primary site operating in FDD mode.

In some implementations, the secondary sites can include additional wireless systems coupled to the transceivers that are configured to operate as access points for a personal area network (e.g., Bluetooth), a wireless local area network (e.g., the 802.11 standards, Wi-Fi), or a wireless metropolitan area network (e.g., the 802.16 standards, WiMAX). The transmission between primary and secondary sites is content neutral and operation within the safe area is application neutral. The secondary site could be a laptop or an access point and the content could be voice, data, or video.

However, the commercially-available base stations for these networks may require reconfiguration to allow the transceivers to operate in TDD mode at the new microwave operating frequencies. In some implementations, the secondary sites can operate as nodes in an ad-hoc or mesh network, where a secondary site can communicate directly with another secondary site in the same safe area.

A primary site operating as a PTMP system can use, for example, a phased array antenna for beamforming. A phased array antenna has multiple radiating elements. The relative phases of a signal radiated by the elements allow the received signals to be added constructively in a desired direction and destructively in an undesired direction. This determines the effective radiation pattern of the phased array antenna, allowing amplified directed transmission of a signal. Similarly, the relative phases of a signal transmitted by a transceiver and received by the phased array antenna elements allow the received signals to be added constructively.

For example, when a primary site is communicating with a secondary site in TDD mode on a particular frequency, the phased array antenna of the primary site can direct the beam towards the secondary site. When the primary site switches to communicate with a different site in the safe area, the phased array antenna of the primary site can direct the beam towards the direction of the new site.

A number of embodiments of the invention have been described. Nevertheless, it will be understood that various modifications may be made without departing from the spirit and scope of the invention. For example, the methods discussed may be applicable to a system operating on a licensed microwave path or a system operating on an unlicensed or unregulated microwave path. A coordination study may have been conducted on the unlicensed or unregulated microwave path, or the operator of the system may otherwise have qualified for an exclusive use license of the microwave path. The primary sites may operate on coordinated paths on frequencies, e.g., radio frequencies, lower than microwave frequencies. Accordingly, other embodiments are within the scope of the following claims.

What is claimed is:

1. A method for operating an uncoordinated microwave path in coordinated frequency bands comprising:
   determining a safe area defined by and including the union of a first coordination area of a first base station at a first site and a second coordination area of a second base station at a second site, including
      determining interference contours of the first coordination area from an antenna pattern at the first base station, transceiver power transmitting from the first base station on a first frequency and a second frequency of a frequency pair, and an Effective Isotropic Radiated Power (EIRP) associated with the first base station, and
      determining interference contours of the second coordination area from an antenna pattern at the second base station, transceiver power transmitting from the second base station on a first frequency and a second frequency of the frequency pair, and an EIRP associated with the second base station,
      where the interference contours represent co-channel interference within the safe area, created by transmitting from the first base station and second base station, as a result of which no foreign transceiver can operate on a different coordinated microwave path on the first frequency or the second frequency in the safe area without being subjected to or causing interference greater than a permissible level;
   operating a first coordinated microwave path from the first base station to the second base station on the frequency pair using frequency division duplex-time division duplex (FDD-TDD);
   operating a second coordinated microwave path from the second base station to the first base station on the frequency pair using FDD-TDD such that the first frequency and the second frequency cause the co-channel interference; and
   transmitting on an uncoordinated microwave path operating with time division duplex (TDD) from a transceiver portion of the first base station to a transceiver portion at a third site located in the safe area on the first and/or second frequency using a side lobe of an antenna of the first base station.

2. A method for operating an uncoordinated microwave path in coordinated frequency bands comprising:

determining a safe area defined by and including the union of a first coordination area of a first base station at a first site and a second coordination area of a second base station at a second site, including determining interference contours of the first coordination area from an antenna pattern at the first base station, transceiver power transmitting from the first base station on a first frequency and a second frequency of a frequency pair, and an Effective Isotropic Radiated Power (EIRP) associated with the first base station, and determining interference contours of the second coordination area from an antenna pattern at the second base station, transceiver power transmitting from the second base station on a first frequency and a second frequency of the frequency pair, and an EIRP associated with the second base station, where the interference contours represent co-channel interference within the safe area, created by transmitting from the first base station and second base station, as a result of which no foreign transceiver can operate on a different coordinated microwave path on the first frequency or the second frequency in the safe area without being subjected to or causing interference greater than a permissible level;

operating a first coordinated microwave path from the first base station to the second base station on the frequency pair using frequency division duplex-time division duplex (FDD-TDD);

operating a second coordinated microwave path from the second base station to the first base station on the frequency pair using FDD-TDD such that the first frequency and the second frequency cause the co-channel interference; and transmitting on an uncoordinated microwave path operating with time division duplex (TDD) from a transceiver portion at a third site located in the safe area to a transceiver portion of the first base station on the first frequency and/or second frequency using a side lobe of an antenna of the first base station.

3. The method of claim 2, wherein the transceiver portion at the third site is configured to operate as an access point or laptop for a personal area network, a wireless local area network, or a wireless metropolitan area network.

4. A method for operating an uncoordinated microwave path in coordinated frequency bands comprising:

determining a safe area defined by and including the union of a first coordination area of a first base station at a first site and a second coordination area of a second base station at a second site, including determining interference contours of the first coordination area from an antenna pattern at the first base station, transceiver power transmitting from the first base station on a first frequency and a second frequency of a frequency pair, and an Effective Isotropic Radiated Power (EIRP) associated with the first base station, and determining interference contours of the second coordination area from an antenna pattern at the second base station, transceiver power transmitting from the second base station on a first frequency and a second frequency of the frequency pair, and an EIRP associated with the second base station, where the contours represent co-channel interference within the safe area, created by transmitting from the first base station and second base station, as a result of which no foreign transceiver can operate on a different coordinated microwave path on the first frequency or the second frequency in the safe area without being subjected to or causing interference greater than a permissible level;

operating a first coordinated microwave path from the first site base station to the second base station on the frequency pair using frequency division duplex-time division duplex (FDD-TDD);

operating a second coordinated microwave path from the second base station to the first base station on the frequency pair using FDD-TDD such that the first frequency and the second frequency cause the co-channel interference; and determining configurations for one or more transceiver portions of one or more new sites in the safe area, the transceiver portion of each new site to be configured to transmit on an uncoordinated microwave path operating with time division duplex (TDD) to the transceiver portion of the first base station on the first frequency and/or second frequency using a side lobe of an antenna of the first base station.

5. The method of claim 4, wherein determining the configurations for one or more transceiver portions at one or more new sites comprises:

for each new site, selecting settings for one or more parameters of the transceiver portion at the new site, the parameters including the location for an antenna, the orientation of the antenna, the gain of the antenna, or the power of the transceiver portion;

for each new site, estimating the interference from the transceiver portion of the new site to a transceiver portion of one or more sites located outside the safe area, the transceiver portion of each site located outside the safe area configured to operate on a different coordinated microwave path on the first frequency; and estimating the interference from the transceiver portion of the first base station to the transceiver portion of the one or more sites located outside the safe area.

6. The method of claim 5, further comprising:

for each new site and for each site located outside the safe area, determining whether the ratio of harmful interference from the transceiver portion of the first or second base station to the interference from the transceiver portion at the new site is greater than or equal to one; and for each new site and for each site located outside the safe area, if the ratio is not greater than or equal to one, adjusting the settings for the one or more parameters of the transceiver portion at the new site.

7. The method of claim 5, wherein one or more sites located outside the safe area is an existing site.

8. The method of claim 5, wherein one or more sites located outside the safe area is a modeled future site.

9. The method of claim 5, wherein the interference from the transceiver portion of a site located inside the safe area to the transceiver portion of a site located outside the safe area, IFrxTrx, is calculated according to: IFrxTrx=TrxEIRP+ AFrx−96.6−20 log(Fo)−20 log(D), where: TrxEIRP=Equivalent Isotropic Radiated Power of the transceiver portion of the site located inside the safe area transmitting directly towards the transceiver portion of the site located outside the safe area in dBm, AFrx=antenna gain of the transceiver portion of the site located outside the safe area at an angle directly towards the transceiver portion of the site located inside the safe area in dBi, Fo=first frequency in GHz, and D=distance between the site located inside the safe area and the site located outside the safe area in miles.

10. A system for operating an uncoordinated microwave path in coordinated frequency bands comprising:
a first base station at a first site, the first base station comprising a transceiver portion;
a second base station at a second site, the second base station comprising a transceiver portion, wherein the transceiver portion of the first base station and the transceiver portion of the second base station are configured to provide a first coordinated microwave path from the first base station to the second base station on a frequency pair using frequency division duplex (FDD) and to provide a second coordinated microwave path from the second base station to the first base station on the frequency pair using FDD such that a first frequency and a second frequency of the frequency pair operate with frequency division duplex-time division duplex (FDD-TDD) so as to cause co-channel interference; and
a transceiver portion at a third site, the transceiver portion of the third site configured to transmit to or receive from the transceiver portion of the first base station on an uncoordinated microwave path operating with time division duplex (TDD) on the first frequency and/or the second frequency using a side lobe of an antenna of the first base station, the third site located in a safe area defined by and including the union of a first coordination area of the first base station and a second coordination area of the second base station and the safe area being subject to the co-channel interference created by transmitting from the first base station and the second base station as a result of which no foreign transceiver can operate on a different coordinated microwave path on the first frequency or the second frequency in the safe area without being subjected to or causing interference greater than a permissible level.

11. An auxiliary station comprising:
a transceiver portion located in a safe area defined by and including the union of a first coordination area of a first base station at a first site and a second coordination area of a second base station at a second site, the safe area being subject to co-channel interference created by transmitting from the first base station and the second base station on a first frequency and a second frequency using frequency division duplex-time division duplex (FDD-TDD) as a result of which no foreign transceiver can operate on a different coordinated microwave path on the first frequency or the second frequency in the safe area without being subjected to or causing interference greater than a permissible level, the transceiver portion configured to transmit to and receive from a transceiver portion of the first base station on an uncoordinated microwave path operating with time division duplex (TDD) on the first frequency and/or a second frequency using a side lobe of an antenna of the first base station.

12. A first base station comprising:
a transceiver portion at a first site configured to transmit to and receive from a transceiver portion of a second base station at a second site on a coordinated microwave path pair on a first frequency and a second frequency using frequency division duplex-time division duplex (FDD-TDD), the transceiver portion of the first base station further configured to transmit to and receive from a transceiver portion at a third site on an uncoordinated microwave path operating with time division duplex (TDD) on the first frequency and/or second frequency using a side lobe of an antenna of the first base station, the third site located in a safe area, the safe area defined by and including the union of a first coordination area of the first base station and a second coordination area of the second base station, the safe area being subject to co-channel interference created by transmitting from the first base station and the second base station on the first frequency and the second frequency as a result of which no foreign transceiver can operate on a different coordinated microwave path on the first frequency or the second frequency in the safe area without being subjected to or causing interference greater than a permissible level.

13. The method of claim 1, wherein transmitting on an uncoordinated microwave path from the transceiver portion of the first base station to the transceiver portion at the third site includes transmitting on the first frequency and the second frequency.

14. The method of claim 2, wherein transmitting on an uncoordinated microwave path from the transceiver portion at the third site to the transceiver portion of the first base station includes transmitting on the first frequency and the second frequency.

* * * * *

UNITED STATES PATENT AND TRADEMARK OFFICE
CERTIFICATE OF CORRECTION

| | | |
|---|---|---|
| PATENT NO. | : 7,949,344 B1 | |
| APPLICATION NO. | : 11/674621 | |
| DATED | : May 24, 2011 | |
| INVENTOR(S) | : Michael Mulcay | |

It is certified that error appears in the above-identified patent and that said Letters Patent is hereby corrected as shown below:

Column 16, Lines 5-6, Claim 4, after "first" delete "site"

Signed and Sealed this

Thirteenth Day of September, 2011

David J. Kappos
*Director of the United States Patent and Trademark Office*